UNITED STATES PATENT OFFICE.

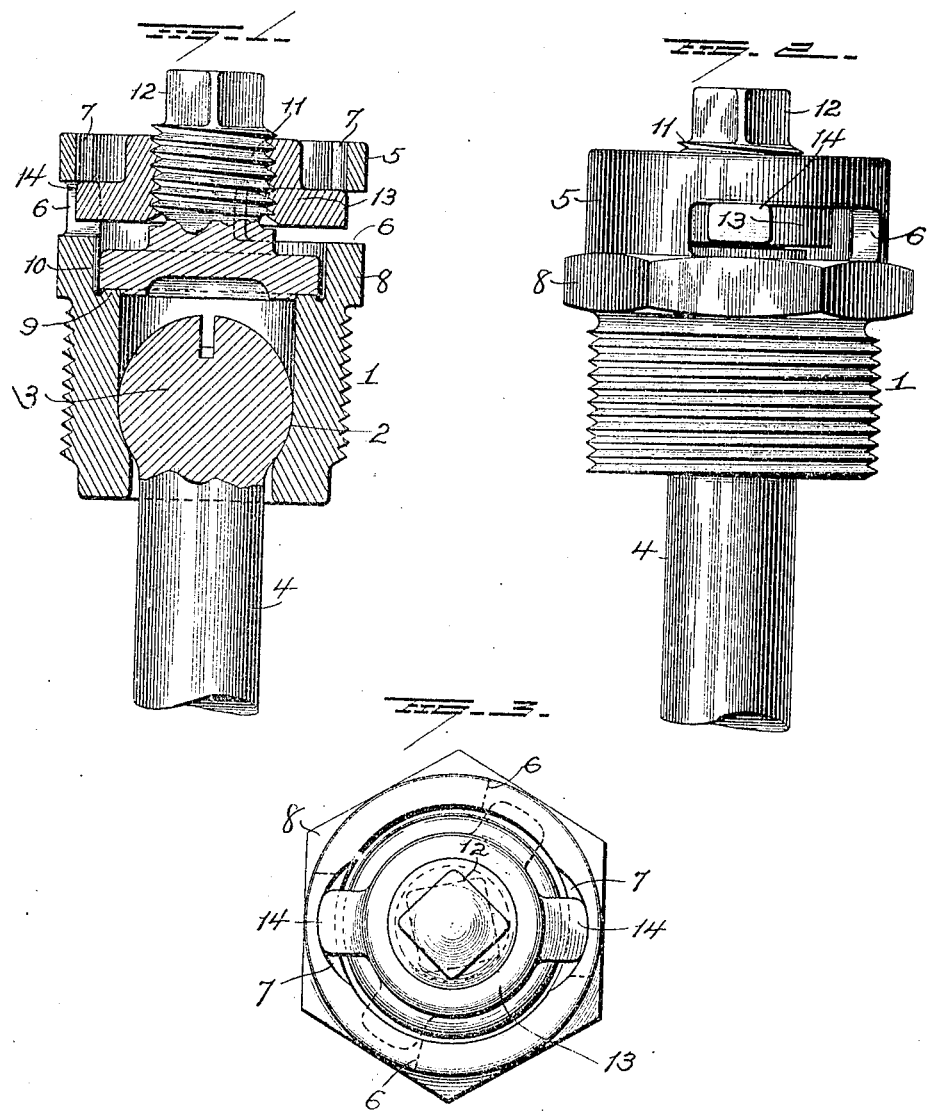

ETHAN I. DODDS, OF PITTSBURGH, PENNSYLVANIA, ASSIGNOR TO FLANNERY BOLT COMPANY, OF PITTSBURGH, PENNSYLVANIA.

STAY-BOLT STRUCTURE.

1,291,786.  Specification of Letters Patent.  Patented Jan. 21, 1919.

Application filed April 26, 1918. Serial No. 230,905.

*To all whom it may concern:*

Be it known that I, ETHAN I. DODDS, a citizen of the United States, and a resident of Pittsburgh, in the county of Allegheny and State of Pennsylvania, have invented certain new and useful Improvements in Stay-Bolt Structures; and I do hereby declare the following to be a full, clear, and exact description of the invention, such as will enable others skilled in the art to which it appertains to make and use the same.

This invention relates to improvements in staybolt structures for boilers and more particularly to the closure construction for the bearing sleeve,—objects of the invention being to provide such a closure construction which will enable the cap or closure to be quickly removed to expose the head of the bolt for testing the latter; which will also permit said cap or closure to be quickly replaced, and which will operate normally to retain the cap or closure on its seat.

With these and other objects in view, the invention consists in certain novel features of construction and combinations of parts as hereinafter set forth and pointed out in the claims.

In the accompanying drawings; Figure 1 is a sectional view of a staybolt structure embodying my improvements; Fig. 2 is a side elevation, and Fig. 3 is a plan view.

1 represents a threaded bearing sleeve having an interior curved portion 2 forming a bearing for the rounded or spherical head 3 of a staybolt 4.

The sleeve 1 is made with an extension 5, having horizontal slots 6 in its wall and at one end of each of said slots, the inner wall of the sleeve extension is made with longitudinal recess 7.

The sleeve extension 5 may be provided with an angular or nut portion 8 to receive a wrench to facilitate the screwing of the sleeve through a suitable hole in the boiler sheet.

An annular seat 9 is provided near the juncture of the extension 5 with the body of the bearing sleeve, for cap or closure 10 disposed within said sleeve extension, and said cap or closure may be recessed on its inner face near its periphery, to facilitate the centering of the same. If desired the inner face of the cap or closure may be made concave to insure adequate clearance for the bolt head.

The cap or closure 10 is provided with a shank 11 having a left-hand screw thread and the free end 12 of said shank is made angular to receive a wrench.

A locking member 13 is threaded on the shank 11 and said member is provided with lateral lugs 14 which pass through the longitudinal recesses 7 in the inner wall of the sleeve extension when said member is being inserted into or removed from the sleeve extension.

When the parts shall have been assembled and the cap and locking member is turned by application of a wrench to the shank 11 on said cap, the lugs 14 of the locking member will enter the slots 6 of the sleeve extension. When the lugs shall have reached end walls of said slots, further effort to turn the cap and its shank, will result in forcing said cap tightly upon its seat on the bearing sleeve and cause the lugs to bind tightly against the upper walls of the slots 6, thus securely locking the cap or closure 10 in place.

It is apparent that by reversing the movements above described, the cap will be loosened and unlocked and may be quickly removed from the sleeve extension, when the head of the bolt will be accessible for testing purposes. It will be clear that the cap may be as quickly replaced and locked.

Having fully described my invention what I claim as new and desire to secure by Letters-Patent, is:—

1. In a staybolt structure, the combination with a bearing sleeve having a slotted extension and a cap seat, of a cap to enter said sleeve extension, said cap having a threaded shank, and a locking member threaded on said shank and coöperable with the slotted sleeve extension to lock the cap onto its seat.

2. In a staybolt structure, the combination with a bearing sleeve having a slotted sleeve-extension and a cap seat, said sleeve extension also having longitudinal recesses, of a cap to enter said sleeve-extension, said cap having a threaded shank provided with a part to receive a wrench, and a locking member threaded on said shank and having lugs movable through said longitudinal recesses whereby when turning force is applied to the shank of the cap, the lugs of the locking member will enter the slots of the sleeve-extension and the cap forced against its seat.

In testimony whereof I have signed this specification in the presence of two subscribing witnesses.

ETHAN I. DODDS.

Witnesses:
S. G. NOTTINGHAM,
R. S. FERGUSON.